United States Patent Office 3,438,983
Patented Apr. 15, 1969

3,438,983
COMPLEX ADDITION PRODUCTS OF PHOSPHORUS PENTAFLUORIDE AND SUBSTITUTED NITRILES
Mervin E. Brokke, Richmond, Calif., George E. Lukes, deceased, late of El Cerrito, Calif., by John Hazzard, administrator, Kentfield, Calif., and Duane R. Arneklev, Sunnyvale, Calif., assignors to Stauffer Chemical Company, New York, N.Y., a corporation of Delaware
No Drawing. Filed Apr. 20, 1965, Ser. No. 450,264
Int. Cl. C07f 9/02
U.S. Cl. 260—247            5 Claims

ABSTRACT OF THE DISCLOSURE

Compounds which are adduct complexes of phosphorus pentafluoride and certain substituted nitriles corresponding to the formula $$[R-(CH_2)_n-C\equiv N\cdot PF_5]$$

in which $n$ is an integer from 1 to 3, inclusive, and R is hydrogen lower, alkoxy, morpholino, and substituted amino in which the substituents are hydrogen lower, alkyl lower, alkenyl or cyclohexyl. The above compounds are effective herbicides. Representative compounds are: diethylaminopropionitrile-phosphorus pentafluoride complex, diethylaminobutyronitrile-phosphorus pentafluoride complex, $\beta$-N-morpholinopropionitrile phosphorus pentafluoride complex, 3-methoxypropionitrile-phosphorus pentafluoride complex, diallylaminopropionitrile-phosphorus pentafluoride complex.

---

This invention relates to certain new and novel organic compounds which may be used as herbicides. More particularly, this invention pertains to complex addition products of phosphorus pentafluoride and certain substituted nitriles as represented by the following formula:

$$[R-(CH_2)_n-C\equiv N\cdot PF_5]$$

wherein $n$ is an integer from 1 to 3, inclusive, and R is selected from the group consisting of methoxy, morpholino and substituted amino wherein said substituents are selected from the group consisting of hydrogen, lower alkyl having 1 to 3 carbon atoms, inclusive, allyl and cyclohexyl, substituted therefore.

It has been found that the new and novel compounds of the present invention are particularly effective as herbicides. They are effective in the control of grasses and broadleaf plants exhibiting both pre-emergence and post-emergence activity.

The compounds of the present invention can be prepared by various methods. One such method is by contacting the appropriate nitrile under anhydrous conditions with gaseous phosphorus pentafluoride in a cooled normally inert liquid organic solvent, such as benzene, toluene and the like. The products can be obtained in very high yields and technical purity.

Although the exact nature of the phosphorus pentafluoridenitrile adducts of the present invention have not as yet been fully determined, the evidence gathered thus far indicates them to be a type of addition product, since their formation is not accompanied by the elimination or formation of any detectable by-products. In lieu of more substantial evidence as to the exact nature of the instant compounds any further discussion along theoretical lines of possible structure will be foregone. It should be pointed out, however, that the formulation of the compounds of the present invention are not promiscuous, but instead are discrete compositions.

The method of preparing typical compounds of the present invention, as well as the manner of using them in herbicidal compositions, are illustrated in the following examples.

EXAMPLE 1

Preparation of diethylaminopropionitrile-phosphorus pentafluoride complex

Under anhydrous conditions, 19.0 g. (0.15 mol) of phosphorus pentafluoride gas were passed into a solution of 12.6 g. (0.1 mol) of diethylaminopropionitrile in 100 ml. of benzene at 25–30° C. with adequate stirring. A yellow solid precipitated and was recovered by filtering. After washing with benzene and drying under anhydrous conditions a yield of 18 g. or 71% of theory was obtained, M.P. 76–78° C.

*Analysis.*—Calculated for $C_7H_{14}N_2\cdot PF_5$: Carbon, 33.2%; hydrogen 5.5%; phosphorus, 12.6%. Found: carbon, 32.9%; hydrogen, 5.9%; phosphorus, 12.6%.

EXAMPLE 2

Preparation of $\beta$-N-morpholinopropionitrile-phosphorus pentafluoride complex In the same manner as Example 1, 19.0 g. (0.15 mol) of phosphorus pentafluoride gas were passed into a solution of 12.4 g. (0.1 mol) of $\beta$-N-morpholinopropionitrile in 100 ml. of benzene at 25–30° C. with stirring. There was obtained 9 g. of product with a melting point of 124–128° C.

*Analysis.*—Calculated for $C_7H_{12}N_2O\cdot PF_5$: Nitrogen, 11.2%; phosphorus, 12.7%. Found: Nitrogen, 11.0%; phosphorus, 11.7%.

EXAMPLE 3

Preparation of diethylaminobutyronitrile-phosphorus pentafluoride

In the same manner as Example 1, 19.0 g. (0.15 mol) of phosphorus pentafluoride gas were passed into a solution of 14.0 g. (0.1 mol) of diethylaminobutyronitrile in 100 ml. of benzene at 25–30° C. with stirring. There was obtained 14 g. of product with a melting point of 59–61° C.

*Analysis.*—Calculated for $C_8H_{16}N_2\cdot PF_5$: Fluorine, 35.6%; phosphorus, 12.0%. Found: Fluorine, 35.1%; phosphorus, 11.8%.

The following is a table of the complexes prepared according to the aforedescribed procedures. Compound numbers have been assigned to each member and are used in reference throughout the balance of the application.

TABLE I $[R-(CH_2)_n-C\equiv N\cdot PF_5]$

| Compound No. | n | R |
|---|---|---|
| 1[1] | 2 | N,N-diethylamino. |
| 2 | 2 | N,N-dimethylamino. |
| 3[1] | 3 | N,N-diethylamino. |
| 4 | 2 | N-methylamino. |
| 5[1] | 2 | Morpholino. |
| 6 | 2 | N-cyclohexylamino. |
| 7 | 1 | Hydrogen. |
| 8 | 2 | Methoxy. |
| 9 | 2 | N,N-diallylamino. |
| 10 | 2 | Hydrogen. |
| 11 | 2 | N,N-di-n-propylamino. |

[1] No. 1 prepared in Example 1. No. 5 prepared in Example 2. No. 3 prepared in Example 3.

As previously mentioned, the herein described novel compositions produced in the abovedescribed manner are phytotoxic compounds which are useful and valuable in controlling various plant species. The compounds of this invention were tested as herbicides in the following manner.

Pre-emergence herbicide test.—The seeds of crab grass, foxtail, red oats, watergrass, pigweed, Indian mustard and curled dock were planted in individual rows one-half inch deep in Santa Cruz sandy loam soil contained in compressed paper flats 8¼″ x 6½″ which are 2¾″ deep. Enough seeds were planted to give about thirty to fifty plants each of the plant species in each flat. The flats were watered after planting. The following day each flat was sprayed at the rate of 20 pounds of the candidate compound under test in 80 gallons of solution per acre. An atomizer was used to spray the solution on the soil surface. Two weeks later the degree of weed control was determined by comparing the amount of germination and growth of each weed in the treated flat with weeds in several untreated control flats. The herbicidal activity of the compounds is reported in Table II.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. The compound, diethylaminopropionitrilephosphorus pentafluoride complex.
2. The compound, diethylaminobutyronitrilephosphorus pentafluoride complex.
3. The compound, β-N-morpholinopropionitrilephosphorus pentafluoride complex.
4. The compound, diallylaminopropionitrilephosphorus pentafluoride complex.

TABLE II.—PRE-EMERGENCE ACTIVITY

| Compound No. | Crab grass | Foxtail | Water grass | Red oats | Pigweed | Indian mustard | Curled dock |
|---|---|---|---|---|---|---|---|
| 1 | +++ | +++ | +++ | +++ | +++ | +++ | ++ |
| 2 | +++ | +++ | +++ | +++ | +++ | ++ | +++ |
| 3 | + | - | - | - | - | - | - |
| 4 | +++ | +++ | +++ | +++ | - | - | - |
| 5 | +++ | +++ | +++ | +++ | +++ | +++ | ++ |
| 6 | +++ | +++ | +++ | +++ | +++ | ++ | + |
| 7 | +++ | +++ | +++ | +++ | +++ | +++ | - |
| 8 | +++ | +++ | +++ | +++ | +++ | +++ | +++ |
| 9 | +++ | +++ | +++ | +++ | - | - | - |
| 10 | +++ | +++ | +++ | ++ | ++ | - | + |
| 11 | +++ | +++ | +++ | +++ | ++ | + | - |

+++=severe injury, death or inhibited germination. ++=moderate injury, such as leaf malformation or leaf burn. +=slight injury, such as leaf burn.

Post-emergence herbicide test.—Seeds of crab grass, pinto bean, curled dock, red oats, Indian mustard and watergrass were planted in flats as used in the pre-emergence testing. The plants were allowed to emerge from the soil and develop to 3 to 6 inches in height. Thereafter, the compound under test was applied to foliage by means of an overhead spray while the flat moves under the spray on a moving belt. A concentration of 0.5% of active compound in the spray was used at a rate of approximately 20 lbs./acre. Two weeks later the injury was rated and recorded as indicated in Table III.

5. A compound of the formula $$[R-(CH_2)_n-C{\equiv}N \cdot PF_5]$$

wherein $n$ is an integer from 1 to 3, inclusive, and R is selected from the group consisting of methoxy, morpholino and substituted amino wherein said substituents are selected from the group consisting of hydrogen, lower alkyl having 1 to 3 carbon atoms, inclusive, allyl and cyclohexyl.

TABLE III.—POST-EMERGENCE ACTIVITY

| Compound No. | Crab grass | Water grass | Red Oats | Indian mustard | Curled Dock | Pinto bean |
|---|---|---|---|---|---|---|
| 1 | +++ | ++ | +++ | +++ | +++ | +++ |
| 2 | +++ | +++ | ++ | +++ | +++ | +++ |
| 3 | +++ | +++ | + | +++ | +++ | +++ |
| 4 | +++ | ++ | +++ | + | + | +++ |
| 5 | +++ | +++ | ++ | +++ | ++ | +++ |
| 6 | +++ | ++ | + | - | ++ | +++ |
| 7 | +++ | + | ++ | +++ | +++ | +++ |
| 8 | +++ | + | + | + | - | ++ |
| 9 | + | - | + | + | - | + |
| 10 | + | - | + | + | + | ++ |
| 11 | + | - | - | - | - | + |

The compounds of the present invention may be used as pre-emergence or post-emergence herbicides and may be applied in a variety of ways at various concentrations. In practice the compounds are usually formulated with an inert herbicidal adjuvant, utilizing methods well-known to those skilled in the art, thereby making them suitable for application as dusts, sprays or drenches. The amount applied will depend upon the nature of the seeds or plants to be controlled and the rate of application may vary from 1 to 80 pounds per acre. One patricularly advantageous way of applying the herbicidal composition comprising the adjuvant and an effective amount of a compound of the present invention is as a narrow band along a row crop, straddling the row.

References Cited

UNITED STATES PATENTS 1,915,334  6/1933  Salzberg et al. _____ 260—243
2,075,359  3/1937  Salzberg et al. _____ 167—22

OTHER REFERENCES

Peach et al., J. Org. Chem., pt. 1, pp. 1–1344 at pp. 799–805, only p. 803 relied on (1963).

ALTON D. ROLLINS, Primary Examiner.

JOSE TOVAR, Assistant Examiner.

U.S. Cl. X.R.

260—465.5, 465.6; 71—86, 88